Dec. 7, 1965  R. R. RIMMEY  3,221,639
BALE LENGTH CONTROL DEVICE
Filed Oct. 23, 1964
*Fig. 1.*
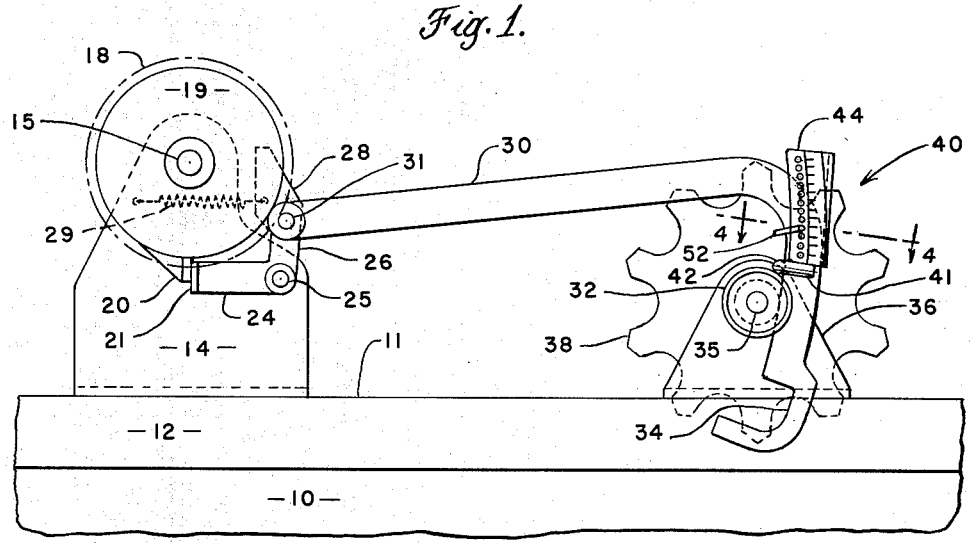
*Fig. 3.*  *Fig. 2.*
*Fig. 4.*
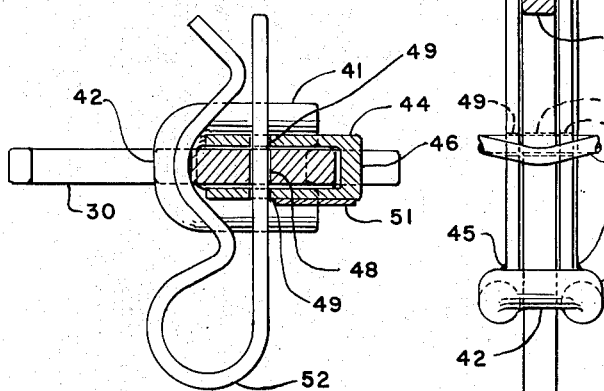
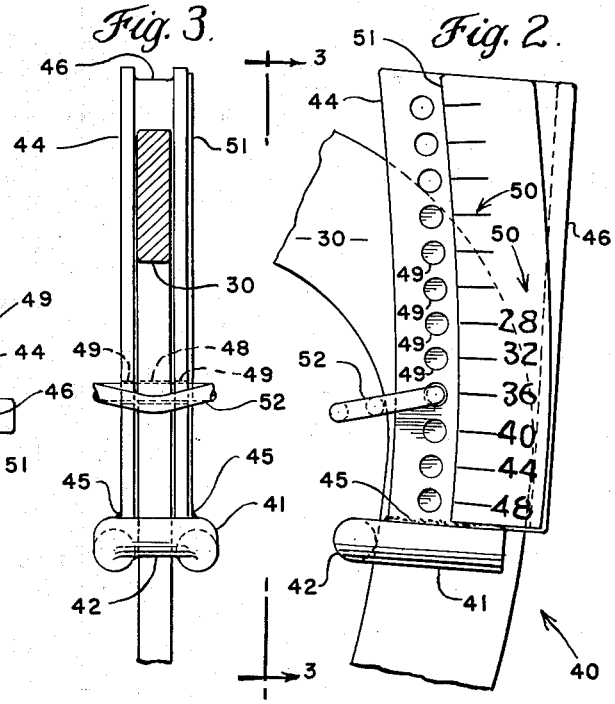
INVENTOR.
ROBERT R. RIMMEY
BY *Walter V. Wright*
AGENT

United States Patent Office 3,221,639
Patented Dec. 7, 1965

3,221,639
BALE LENGTH CONTROL DEVICE
Robert R. Rimmey, Centre Hall, Pa., assignor to Sperry Rand Corporation, New Holland, Pa., a corporation of Delaware
Filed Oct. 23, 1964, Ser. No. 406,032
3 Claims. (Cl. 100—4)

This invention relates, generally, to automatic hay balers. More specifically, it relates to improved means for controlling the lengths of bales formed by automatic hay balers.

In conventional hay balers, cut and windrowed hay is picked up and conveyed in successive charges into a bale case. Each charge is compressed by a reciprocating plunger in the bale case. As each bale takes form, it is progressively forced rearwardly in the bale case by the plunger. The compacted mass of hay in the bale case is divided and tied into separate bales by intermittently operated tying mechanism which is triggered by a trip arm. The trip arm is operated by a metering wheel which projects into the bale case and is rotatably driven by the rearwardly moving compressed hay. As the metering wheel and its shaft turn, a roller on the metering wheel shaft moves the trip arm from an initial position to a triggering position. When the trip arm reaches the triggering position, it actuates the tying mechanism to tie the compressed hay into a completed bale and reset the trip arm to its initial position. The lengths of the bales may be changed by varying the length of travel of the trip arm between its initial position and its triggering position. On present balers this adjustment is provided by a collar carried by the trip arm. The collar is clamped to the trip arm by a bolthead set screw. The collar serves as a stop which defines the initial position of the trip arm. By loosening the set screw and moving the collar toward or away from the triggering end of the trip arm, the lengths of the completed bales may be, respectively, decreased or increased. A typical example of this mechanism may be seen in U.S. Patent 2,981,173.

While this mechanism fulfills its intended purpose, a wrench is required to operate the bolthead set screw when it is desired to vary the bale length setting. The collar and set screw are exposed to the corrosive and deteriorating effects of the weather and, in time, the set screw becomes harder to operate. A desired bale length setting is achieved by a time consuming trial-and-error type adjustment of the collar. The set screw only provides frictional clamping engagement with the trip arm unless it is drawn tight enough to indent and mar the trip arm.

It is the general object of this invention to provide improved means for controlling the length of bales formed by automatic hay balers.

It is another object of this invention to provide bale length control means for automatic hay balers wherein no tools are required to change the bale length setting of the mechanism.

It is another object of this invention to provide mechanism for controlling the length of bales formed by automatic hay balers wherein bale length adjustments may be accomplished more quickly and easily than with conventional mechanism.

It is another object of this invention to provide adjustable means for controlling the length of bales formed by automatic hay balers which eliminates guess work and trial-and-error settings from the operation of resetting the mechanism from one bale length to another.

It is another object of this invention to provide adjustable stop means for controlling the length of bales formed by automatic hay balers which is positively locked, as opposed to frictionally held, in the desired position.

It is another object of this invention to provide adjustable stop means for controlling the length of bales formed by automatic hay balers which is uneffected by corrosion and which will not mar the trip arm of the baler.

It is another object of this invention to provide adjustable means for controlling the length of bales formed by automatic hay balers which may be readily added to existing balers.

These and other objects of this invention will be apparent upon reference to the following description and claims taken in conjunction with the accompanying drawings wherein:

FIG. 1 is a fragmentary side elevational view of a hay baler showing a bale length control device constructed in accordance with the principles of the present invention applied to the trip arm of the baler;

FIG. 2 is an enlarged fragmentary side elevational view of the bale length control device shown in FIG. 1;

FIG. 3 is a front elevational view taken on the line 3—3 of FIG. 2; and

FIG. 4 is a sectional view taken on the line 4—4 of FIG. 1.

Referring now to the drawings in detail, the reference numeral 10 in FIG. 1 indicates a portion of one vertical side of the bale case of an automatic hay baler. The bale case has a horizontal top 11 and fore-and-aft extending corner reinforcing angle members 12. The front of the bale case is to the left from FIG. 1 and the rear of the bale case is to the right. When in operation, and moving through a field, the mechanism seen in FIG. 1 would normally move from right to left. Mounted on top of the bale case are brackets 14 (one visible). A shaft 15 is journalled in the brackets 14 and extends therebetween transversely across the bale case. Bale tying mechanism (not visible) is carried by shaft 15 and operated thereby.

A sprocket (not shown), whose pitch circle is indicated by the broken line 18, is journalled on shaft 15 and constantly driven from the baler operating power source by an endless chain (not shown). A one revolution clutch 19 on shaft 15 drivingly connects the sprocket to shaft 15 for one revolution of the sprocket each time the clutch is actuated. This drives the tying mechanism through one complete tying cycle. Clutch 19 has a stop pawl 20 which normally abuts a detent 21 to hold the clutch disengaged. Detent 21 is formed on one end of the horizontal arm 24 of a bell crank which is pivoted at 25 to bracket 14. The other arm 26 of the bell crank extends vertically and carries an abutment 28 at its upper end. A spring 29 has one end anchored on bracket 14 and the other end connected to the upper end of vertical arm 26 of the bell crank. Spring 29 is normally in tension and urges the bell crank in the counterclockwise direction about its pivotal mount 25 to move detent 21 downwardly out of engagement with the clutch stop pawl 20. The bell crank, however, is normally held in the position shown, in opposition to the urging of spring 29, by a trip arm 30 which is pivotally connected at 31 to the vertical arm 26 of the bell crank. Trip arm 30 extends rearwardly from its pivoted end and hooks downwardly over a grooved roller 32. The other end of trip arm 30 has formed therein a tripping notch, or recess, 34. Grooved roller 32 is fixed to a shaft 35 which extends transversely across the top of the bale case and is journalled in brackets 36. A toothed metering wheel 38 is fixed to shaft 35 and projects downwardly through the top 11 of the bale case as may be seen in phantom lines in FIG. 1.

The tripping and actuating of the tying mechanism occurs as follows: as the compacted mass of hay is forced from front to rear in the bale case, it engages metering wheel 38 and drives the metering wheel in the counterclockwise direction. This rotates shaft 35 and grooved roller 32 in the counterclockwise direction and drives the downwardly hooked end of trip arm 30 upwardly. When trip arm 30 has moved upwardly about its pivotally connected end 31 far enough to raise tripping recess 34 to grooved roller 32, spring 29 is able to pull trip arm 30 to the left and move the bell crank counterclockwise about its pivotal mounting 25. This lowers detent 21 from engagement with clutch stop pawl 20 and the clutch rotates counterclockwise driving the tying mechanism drive shaft 15 therewith. After stop pawl 20 moves through an arc of approximately ninety degrees, it strikes abutment 28 on vertical arm 26 of the bell crank. This drives trip arm 30 to the right to disengage tripping recess 34 from grooved roller 32 and allow the trip arm to drop back to its initial position shown in FIG. 1. The striking of abutment 28 by clutch stop pawl 20 also moves the bell crank clockwise about pivotal mount 25 to the position shown in FIG. 1. When stop pawl 20 has continued through the rest of its revolution about shaft 15, it again contacts detent 21 and is stopped thereby. In completing its one revolution of travel, clutch 19 drives the bale tying mechanism through one complete tying cycle, as is well known in the art.

The length of a finished bale is the linear extent of the compacted mass of hay that moves rearwardly past a given point on the bale case between tying operations. Since metering wheel 38 is driven by the rearwardly moving hay mass, its rotation, and that of its shaft 35 and grooved roller 32, is responsive and proportional to the length of hay mass passing behind wheel 38. The distance roller 32 must raise trip arm 30 to bring the tripping recess 34 up to the roller is controlled by the stop device of the present invention which is indicated generally in the drawings by the reference numeral 40. Stop device 40 comprises a U-shaped member 41 whose leg portions extend along opposite sides of trip arm 30. Member 41 has a bight portion 42 which overlies grooved roller 32 and rests on top of roller 32 when trip arm 30 is in its initial position, as may be seen in FIG. 1. When trip arm 30 is in the tripping position with notch 34 engaging grooved roller 32 and the clutch pawl 20 strikes abutment 28, trip arm 30 is driven to the right to release notch 34 from roller 32. The arm 30 then drops under gravity until U-shaped member 41 rests on grooved roller 32. Thus, the initial position of trip arm 30 depends on the location of U-shaped member 41. An elongated vertical channel member 44 is welded at 45 to the upper side of U-shaped member 41 and extends vertically upwardly therefrom. Channel member 44 has deep side portions which lie alongside the respective sides of trip arm 30, and a narrow bight portion 46 which extends upwardly along the rearmost edge of the downturned end of trip arm 30. The U-shaped member 41 and the channel member 44 together encircle the downturned end portion of trip arm 30. As may be seen in FIG. 4, a single hole 48 is drilled transversely through the downturned end portion of trip arm 30. A vertical series of holes 49 (see FIG. 2) are formed in the sides of channel member 44. Indicia 50 are provided on channel member 44 to identify each of the holes 49 with a related bale length. The indicia 50 may be painted or etched directly on channel member 44, or they may be applied to a plate or label as indicated at 51, and the label applied to channel member 44. A spring clip pin 52 extends through the hole 48 in trip arm 30 and may extend through any desired set of holes of the series of holes 49 in channel member 44.

The hole 48 in trip arm 30 is located above tripping notch 34 such a distance that when the lowermost set of holes 49 in channel member 44 are aligned with hole 48, the U-shaped member 41 is disposed above tripping notch 34 a distance corresponding to the greatest desired bale length. By removing spring pin 52, sliding channel member 44 downwardly to align another set of holes 49 with hole 48 and then reinserting pin 52, an operator may change the length of bales produced by the hay baler from one known dimension to another.

The device of this invention eliminates guess work and trial-and-error settings of the trip arm stop member. Bale length changes are performed in a matter of seconds without the use of tools. The spring pin 52 extends transversely through channel member 44 and trip arm 30 to positively lock the stop device against vertical movement relative to the trip arm. None of the cooperating parts operate under such a close fitting relationship that the normal corrosive effects of the weather can effect their operation. The stop device 40 is applied to a trip arm by removing the pivot member 31 which attaches trip arm 30 to the vertical arm 26 of the bell crank. Stop device 40 is then passed over the forward end of trip arm 30 and moved therealong rearwardly to the downturned end portion of the trip arm. This device may be added to existing baler trip arms merely by locating and drilling the single hole 48 through the trip arm to receive locking pin 52.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An improvement in a hay baler having a movable trip arm, a rotary element engaging said trip arm and operable upon rotation to move said trip arm in one direction from an initial position to a tripping position, and adjustable stop means on said trip arm engageable with said rotary element upon movement of said trip arm in the direction opposite said one direction to stop said trip arm in said initial position, the improvement residing in said adjustable stop means and comprising a member having a portion elongated in the direction of movement of said trip arm and disposed along one side of the trip arm, said portion having a row of spaced apart holes therethrough, said row of holes extending in the direction of elongation of said portion, stop means on said member engageable with said rotary element to stop said trip arm in said initial position, said trip arm having a hole therethrough, said member being movable along said trip arm to selectively align any hole of said row of holes with said hole in said trip arm and thereby change the location of said initial position defining stop means relative to said trip arm, and pin means insertable through said hole in said trip arm and any selectively aligned hole of said row of holes to positively lock said member in a selected position on said trip arm.

2. An improvement in a hay baler having a movable trip arm, a rotary element engaging said trip arm and operable upon rotation to move said trip arm in one direction from an initial position to a tripping position, and adjustable stop means on said trip arm engageable with said rotary element upon movement of said trip arm in the direction opposite said one direction to stop said trip arm in said initial position, the improvement residing in said adjustable stop means and comprising a member slidable along said trip arm and having portions elongated in the direction of movement of said trip arm and disposed along opposite sides of the trip arm, said portions each having a row of spaced apart coaxially aligned holes therethrough, said rows of holes extending in the direction of elongation of said portions, stop means on at least one of said portions engageable with said rotary element to stop said trip arm in said initial position, said trip arm having a hole therethrough whose axis is parallel to the respective axes of the holes of said rows of holes whereby upon sliding of said member along said trip arm any of the holes of said rows of holes may be selectively aligned with said hole in said trip arm to locate said stop means in a predetermined selective position relative to the trip arm, and pin means slidably insertable through said hole in said trip arm and any selectively aligned holes of said rows of holes in said member to positively lock said member in a selected position on said trip arm.

3. An improvement in a hay baler having a movable trip arm having sides and edges, a rotary member driven in response to the formation of bales in said hay baler and drivingly engaging one edge of said trip arm, said rotary member being operable upon rotation to move said trip arm in one direction from an initial position to a tripping position, and adjustable stop means on said trip arm engageable with said rotary member upon movement of said trip arm in the direction opposite said one direction to stop said trip arm in said initial position, the improvement residing in said adjustable stop means and comprising a channel member slidably carried on said trip arm and having a narrow bight portion lying along the edge of said trip arm opposite said one edge, said channel member having wide side portions lying along opposite sides of said trip arm and elongated in the direction of movement of said trip arm, said side portions each having a row of holes formed therein, said rows extending in the direction of elongation of said side portions, the holes in one of said side portions being coaxially aligned respectively with the holes in the other side portion, a generally U-shaped stop fixedly attached to one end of said channel member and having leg portions lying along opposite sides of said trip arm, said U-shaped stop having a narrow bight portion lying along said one edge of the trip arm in position to impassibly engage said rotary member, said trip arm having a hole therethrough whose axis is perpendicular to said sides whereby upon sliding of said channel member along said trip arm any of the holes of said rows of holes may be selectively aligned with said hole in said trim arm to thereby vary the location of said U-shaped stop relative to said trip arm, and pin means slidably insertable through selectively aligned holes in said trip arm and said channel member to positively lock said channel member in a selected position on said trip arm.

References Cited by the Examiner

UNITED STATES PATENTS

| | | | |
|---|---|---|---|
| 2,516,742 | 7/1950 | Adkisson | 100—4 |
| 2,981,173 | 4/1961 | Nolt | 100—4 |

FOREIGN PATENTS

| | | |
|---|---|---|
| 35,380 | 12/1925 | Denmark. |
| 705,457 | 4/1941 | Germany. |
| 625,231 | 6/1949 | Great Britain. |
| 49,281 | 5/1921 | Sweden. |

WALTER A. SCHEEL, *Primary Examiner.*